United States Patent [19]
Hattori et al.

[11] Patent Number: 5,134,562
[45] Date of Patent: Jul. 28, 1992

[54] FIFO REGISTER DEVICE ADAPTIVELY CHANGING A STAGE NUMBER IN DEPENDENCY ON A BUS CYCLE

[75] Inventors: Naoharu Hattori, Tokyo; Yoshito Nigo, Hyogo, both of Japan

[73] Assignee: NEC Corporation, Tokyo, Japan

[21] Appl. No.: 448,083

[22] Filed: Dec. 12, 1989

[30] Foreign Application Priority Data

Dec. 13, 1988 [JP] Japan ................................ 63-314390

[51] Int. Cl.[5] ............................................. G06F 9/38
[52] U.S. Cl. ............................. 395/400; 364/231.8;
364/238.7; 364/933; 364/939; 364/926.1;
364/254.9; 364/240; 364/DIG. 1; 364/DIG. 2
[58] Field of Search ... 364/200 MS File, 900 MS File;
365/221

[56] References Cited

U.S. PATENT DOCUMENTS

| | | | |
|---|---|---|---|
| 4,458,316 | 7/1984 | Fry et al. ........................... | 364/200 |
| 4,507,760 | 3/1985 | Fraser ............................... | 365/221 |
| 4,527,237 | 7/1985 | Frieder et al. ..................... | 364/200 |
| 4,644,569 | 2/1987 | Brown et al. ...................... | 364/900 |
| 4,649,512 | 3/1987 | Nukiyama ......................... | 364/900 |
| 4,682,284 | 7/1987 | Schrofer ............................ | 364/200 |
| 4,779,234 | 10/1988 | Kaneko et al. .................... | 365/221 |
| 4,803,654 | 2/1989 | Rasberry et al. .................. | 364/900 |
| 4,809,161 | 2/1989 | Torii et al. ........................ | 365/221 |
| 4,839,866 | 6/1989 | Ward et al. ....................... | 365/221 |
| 4,949,252 | 8/1990 | Hauge ............................... | 364/200 |

Primary Examiner—Thomas C. Lee
Assistant Examiner—Mehmet Geckil
Attorney, Agent, or Firm—Foley & Lardner

[57] ABSTRACT

In a first-in-first-out register device positioned intermediately between an address calculation circuit and an operation execution circuit, both of which are individually operable in pipeline fashions, a stage number is varied from one to another in a register unit having a plurality of register stages, in consideration of an execution time which is necessary for a bus access operation carried out in response to a read instruction and which is variable. A maximum usable stage number is determined by a pointer control circuit in response to the variable execution time and is compared with an actual stage number, which is sent from a detector and which indicates an actual stage of the register unit. As a result, the register unit is controlled, so that the actual stage does not exceed the maximum usable stage.

4 Claims, 5 Drawing Sheets

FIG. 1
PRIOR ART

FIG. 2A PRIOR ART
ADDRESS CALCULATION CKT 13

FIG. 2B PRIOR ART
OPERATION EXECUTION CKT 18

FIG. 3A PRIOR ART
ADDRESS CALCULATION CKT 13

FIG. 3B PRIOR ART
OPERATION EXECUTION CKT 18

FIG. 4

FIG. 5A PRIOR ART
ADDRESS CALCULATION CKT 13

FIG. 5B PRIOR ART
OPERATION EXECUTION CKT 18

5,134,562

1

FIFO REGISTER DEVICE ADAPTIVELY CHANGING A STAGE NUMBER IN DEPENDENCY ON A BUS CYCLE

BACKGROUND OF THE INVENTION

This invention relates to a first-in-first-out register device for use in an information processing device to successively memorize a queue of instructions.

A conventional information processing device of the type described comprises an address calculation circuit for calculating an address from each instruction and an execution circuit for carrying out an operation indicated by an instruction. At any rate, both the address calculation circuit and the execution circuit execute instructions under the control of a pipeline controller in pipeline fashions different from each other. In this event, a first-in-first-out register device is located between the address calculation circuit and the execution circuit, to memorize the instructions in the form of a queue between the address calculation circuit and the execution circuit.

Herein, it is assumed that the address calculation circuit often accesses a bus when it executes a specific instruction, such as a read instruction, a write instruction, so as to read or write a data signal from or into a memory connected to the address calculation circuit through the bus. The data signal is memorized in a data register before it is processed by the execution circuit. Such a bus access operation lasts for a bus cycle or an execution time which is defined by a single clock cycle or a plurality of clock cycles.

It is to be noted that the bus cycle may be variable from one to another in such an information processing unit. In this case, when the bus cycle becomes short, the data signal may be read out of the memory before the specific instruction for the data signal is read out of the first-in-first-out register device and executed by the execution circuit. Under the circumstances, the data signal might be extinct, or erased from the data register, prior to execution of the specific instruction.

SUMMARY OF THE INVENTION

It is an object of this invention to provide a first-in-first-out register device which is suitable for an information processing device wherein a bus cycle is variable.

It is another object of this invention to provide a first-in-first-out register device of the type described, which is capable of preventing extinction or erasure of a data signal even when a bus cycle becomes short.

A first-in-first-out register device to which this invention is applicable is for use in an information processing unit which comprises an address calculation circuit successively supplied with instructions and connected to a bus for successively calculating an address of each instruction to produce an address signal specifying the address, an execution circuit successively supplied with the instructions through the first-in-first-out register device for executing each instruction, and a pipeline controller coupled to the address calculation circuit, the execution circuit, and the first-in-first-out register device for controlling the address calculation circuit and the execution circuit in pipeline fashions different from each other. The address calculation circuit accesses the bus during an execution time in response to a specific one of the instructions. The first-in-first-out register device is intermediate between the address calculation circuit and the execution circuit to memorize a queue of the instructions. According to this invention, the first-in-first-out register device comprises a first-in-first-out register unit which is successively supplied with the instructions and which has a predetermined number of register stages. The first-in-first-out register unit is for successively memorizing the instructions. The register device further comprises detector means controlled by the pipeline controller for detecting an actual stage number of the first-in-first-out register unit that is being actually used to produce an actual stage number signal representative of the actual stage number and signal producing means for producing a maximum usable stage signal indicative of a maximum usable stage number of the first-in-first-out register unit. The maximum usable stage number is determined by the execution time on accessing the bus in response to the specific one of the instructions. In addition, the register device comprises comparing means supplied with the actual stage number signal and the maximum usable stage signal and connected to the first-in-first-out register unit for comparing the actual stage number signal with the maximum usable stage signal to control the first-in-first-out register unit so that the first-in-first-out register unit does not exceed the maximum usable stage.

DESCRIPTION OF THE PREFERRED EMBODIMENT

Figure 1:
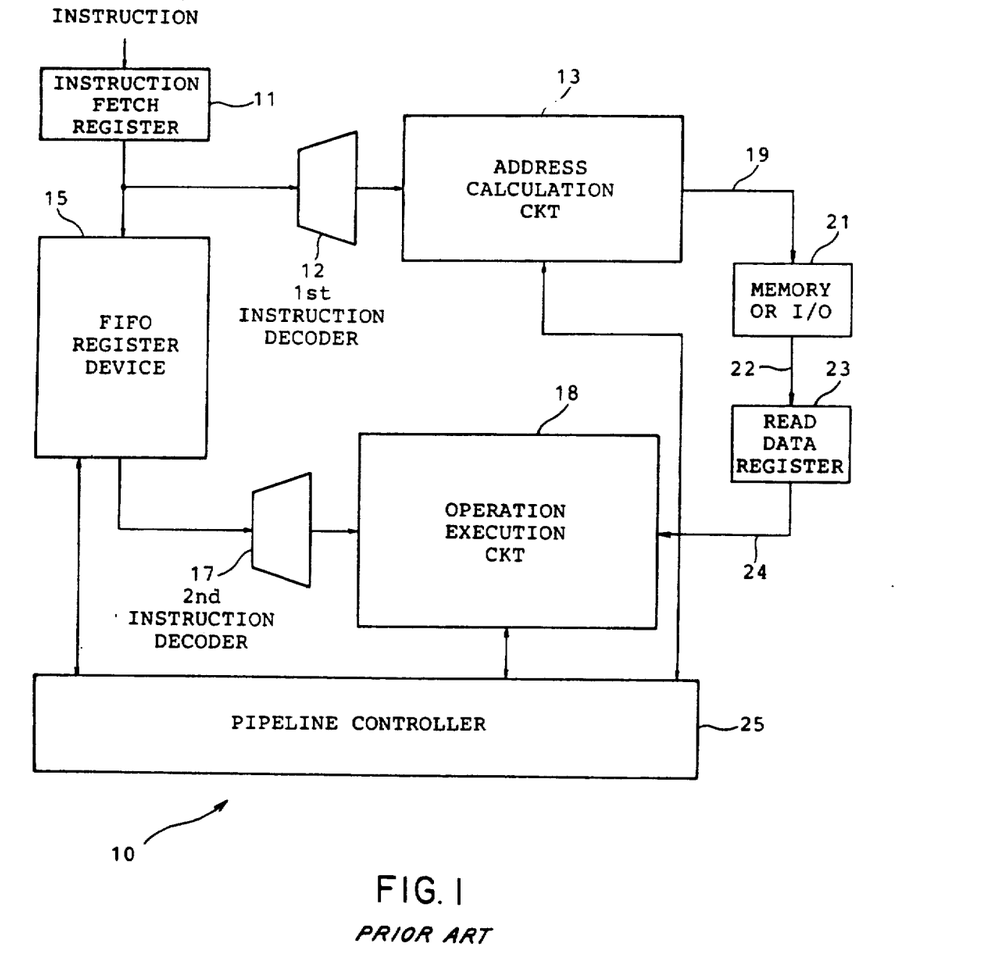
FIG. 1 is a block diagram of a conventional information processing device which comprises a first-in-first-out register device.

Referring to FIG. 1, a conventional information processing device will be described for a better understanding of this invention. The information processing device 10 comprises an instruction fetch register 11 for successively fetching an instruction from an external device (not shown). Each instruction is delivered from the instruction fetch register 11 through a first instruction decoder 12 to an address calculation circuit 13, on one hand, and to a first-in-first-out (FIFO) register device 15, on the other hand. The first-in-first-out register device 15 is connected through a second instruction decoder 17 to an operation execution circuit 18.

The address calculation circuit 13 calculates an address from each instruction sent through the first instruction decoder 12. Specifically, the address calculation circuit 13 may translate a logical address into a physical address. At any rate, the address calculation circuit 13 executes each instruction in a pipeline fashion to calculate an address and to access a bus 19 when an instruction is either a read instruction or a write instruction. The read instruction is indicative of a readout operation from a memory 21, while the write instruction is indicative of a write-in operation into the memory 21. In the example illustrated, a description will be made only of the read instruction. The memory 21 may be replaced by an input/output device, although the description here will be based on the memory. After calculation of the address, a bus cycle is started by the address calculation circuit 13 to access the memory 21. As a result of such an access operation, a readout data signal is sent from the memory 21 through an output bus 22 to a read data register 23 and is thereafter delivered to the operation execution circuit 18 through an internal bus 24. Thus, the address calculation circuit 13 carries out a pipeline operation divisible into a plurality of stages.

It is mentioned here that the bus cycle is determined by an execution time which is necessary for a bus access operation and which is defined with respect to a clock cycle. In other words, a minimum or shortest execution time is defined in relation to the clock cycle.

The operation execution circuit 18 successively executes, in a pipeline fashion, each instruction sent from the first-in-first-out register device 15 through the second instruction decoder 17. In this event, a pipeline operation of the illustrated operation execution circuit 18 is divisible into a plurality of stages and progressive independently of the address calculation circuit 18. Stated otherwise, the pipeline operation carried out in the address calculation circuit 13 is different from that carried out in the operation execution circuit 18.

In order to carry out such different pipeline operations, the address calculation circuit 13 and the operation execution circuit 18 are controlled by a pipeline controller 25. In addition, the pipeline controller 25 also controls the first-in-first-out controller 15. More specifically, the pipeline controller 25 controls timings of the pipeline operation of each of the address calculation circuit 13 and the operation execution circuit 18. Furthermore, the pipeline controller 25 also controls mutual timings between the pipeline operations carried out by the address calculation circuit 13 and the operation execution circuit 18. Moreover, the pipeline controller 25 controls the first-in-first-out register device 15 to indicate a write-in timing and a readout timing of each instruction. The write-in and the readout timings are sent from the pipeline controller 25 to the first-in-first-out register device 15 as a write-in timing signal ENQ and a readout timing signal DEQ, respectively.

Herein, it is assumed that the first-in-first-out register device 15 has a predetermined number, namely, a fixed number of register stages which is selected so that an optimum pipeline operation can be carried out in relation to the bus cycle, as will become clear later.

Figure 2A:
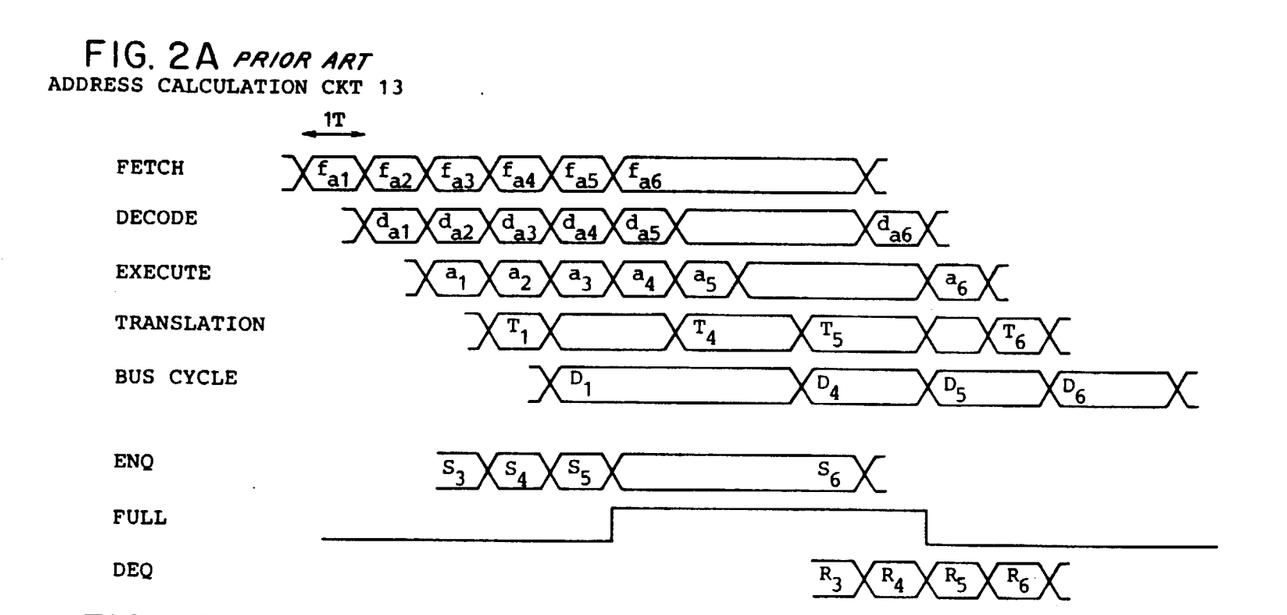
FIGS. 2A and 2B are time charts for use in describing the operation of the conventional information processing device illustrated in FIG. 1.
Figure 2B:
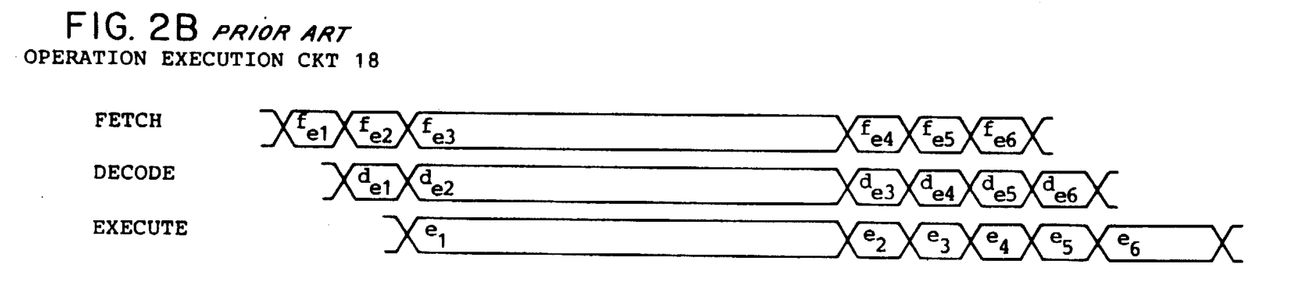

Referring to FIGS. 2A and 2B in addition to FIG. 1, it is assumed that the bus cycle will be related to a minimum execution time for a bus access operation and that the address calculation circuit 13 and the operation execution circuit 18 independently carry out pipeline operations. Moreover, let the first-in-first-out register device 15 have three register stages. In the illustrated example, the pipeline operation in the address calculation circuit 13 is divided into five stages which may be called a fetch stage, a decode stage, an execute stage, a translation stage, and a bus cycle stage, respectively, while the pipeline operation in the operation execution circuit 18 is divided into three stages which may be called a fetch stage, a decode stage, and an execute stage, respectively.

The minimum execution time in the bus cycle stage is equal to two clock cycles when the address calculation circuit 13 accesses the memory 21 and each minimum time of the fetch, the decode, the execute, and the translation stages in the address calculation circuit 13 is equal to a single clock cycle 1T. In FIGS. 2A and 2B first through sixth instructions suggested by suffixes 1 through 6 are successively fetched from the external device into the instruction fetch register 11 at every single clock cycle, as shown along a top line of FIG. 2A, although the sixth instruction is fetched over four clock cycles. Fetch operations for the first through the sixth instructions 1 through 6 are depicted at $f_{a1}, f_{a2}, \ldots, f_{a6}$ in FIG. 2A, respectively. The first through the sixth instructions 1 through 6 are decoded in next clock cycles, respectively, as illustrated by $d_{a1}, d_{a2}, \ldots, d_{a6}$ along a second line of FIG. 2A and successively executed and translated in the pipeline fashion, as shown along third and fourth lines of FIG. 2A, respectively. Herein, the first, the fourth, the fifth, and the sixth instructions 1, 4, 5, and 6 are assumed to be read instructions for accessing the bus. In this connection, the bus cycles are carried out with respect to the first, the fourth, the fifth, and the sixth instructions 1, 4, 5, and 6, as shown at bus cycles depicted at $D_1, D_4, D_5$, and $D_6$, respectively, along a fifth line of FIG. 2A. During the bus cycles $D_1, D_4, D_5$, and $D_6$, data signals are read out of the memory 21 and last for four, two, two, and two clock cycles in the read data register 23, respectively.

On the other hand, the first through the sixth instructions 1 to 6 are successively sent to the first-in-first-out register device 15 in synchronism with the write-in timing signal ENQ, as shown at $S_3, S_4, S_5$, and $S_6$ along a sixth line of FIG. 2A. Inasmuch as the first-in-first-out register device 15 has three stages, as mentioned before, the first-in-first-out register device 15 becomes full of instructions when three instructions are memorized therein. The first-in-first-out register device 15 produces a full state signal FULL representative of a full state of the first-in-first-out register device 15 and supplies the full state signal FULL to the pipeline controller 25. During supply of the full state signal FULL, the pipeline controller 25 controls the address calculation circuit 13 and the operation execution circuit 18 so that no instruction is fetched from the instruction fetch register 11 until the readout timing signal DEQ is produced by the pipeline controller 25. Accordingly, a readout operation of the sixth instruction 6 from the first-in-first-out register device 15 is delayed until the readout timing signal DEQ is produced in synchronism with a readout operation of the third instruction 3, as depicted at R3.

On the other hand, the operation execution circuit 18 is successively supplied with the first through the sixth instructions 1 to 6 each of which is subjected to the fetch stage, the decode stage, and the execute stage suggested by f, d, and e. In this event, the operation execution circuit 18 is controlled by the pipeline controller 25 so that the read instructions, such as the first, fourth, fifth, and sixth instructions 1, 4, 5, and 6, are executed after the data signals are read out of the memory 21 and delivered through the read data register 23 to the operation execution circuit 18. In this connection, the first, fourth, fifth, and sixth instructions 1, 4, 5, and 6 are executed after the corresponding bus cycles $D_1, D_4, D_5$, and $D_6$, respectively, as readily understood from comparison between $D_1$ and $e_1$, between $D_4$ and $e_4$, between $D_5$ and $e_5$, and between $D_6$ and $e_6$ illustrated in FIG. 2. Accordingly, operations can be successively carried out in the order of $D_1$, $e_1$, $D_4$, $e_4$, $D_5$, $e_5$, $D_6$, and $e_6$ without any extinction or erasure of the data signals read out of the memory 21.

Figure 3A:
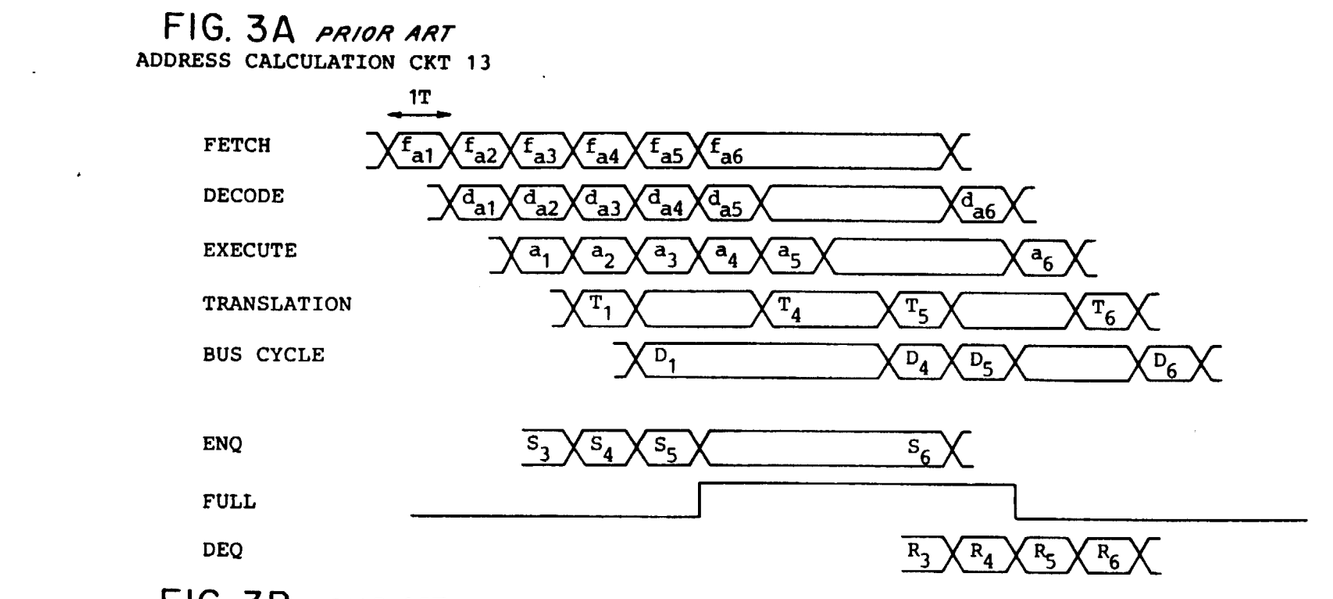
FIGS. 3A and 3B are time charts for use in describing another operation of the conventional information processing device.
Figure 3B:
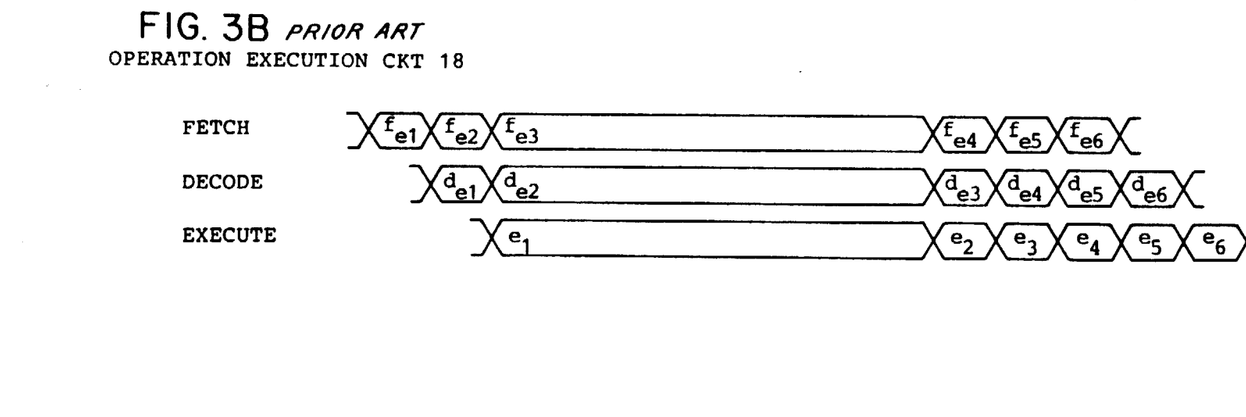

Referring to FIGS. 3A and 3B together with FIG. 1, let the minimum execution time for the bus cycle become short. For example, it is assumed that the minimum execution time becomes equal to a single clock cycle. In the example being illustrated, data signals for the fourth and the fifth instructions 4 and 5 are read out of the memory 21 within two adjacent clock cycles, as depicted at $D_4$ and $D_5$ along a fifth line in FIG. 3A. In this event, the first through fifth instructions must be successively executed by the operation execution circuit 18 and the first, fourth, fifth, and sixth bus cycles $D_1$, $D_4$, $D_5$, and $D_6$ should be synchronized with the first, fourth, fifth, and sixth instructions 1, 4, 5, and 6 read out of the first-in-first-out register device 15, respectively.

As readily understood from FIG. 3A, the fourth instruction 4 is executed in the operation execution circuit 18 after the fourth bus cycle $D_4$ is finished in the address calculation circuit 13, as illustrated at $e_4$. This means that the fourth instruction 4 is executed by the operation execution circuit 18 after the data signal for the fourth instruction is erased from the read data register 23.

Thus, such a conventional information device 10 cannot carry out a normal operation when the minimum execution time for the bus access operation is variable, as pointed out in the preamble of this specification.

Figure 4:
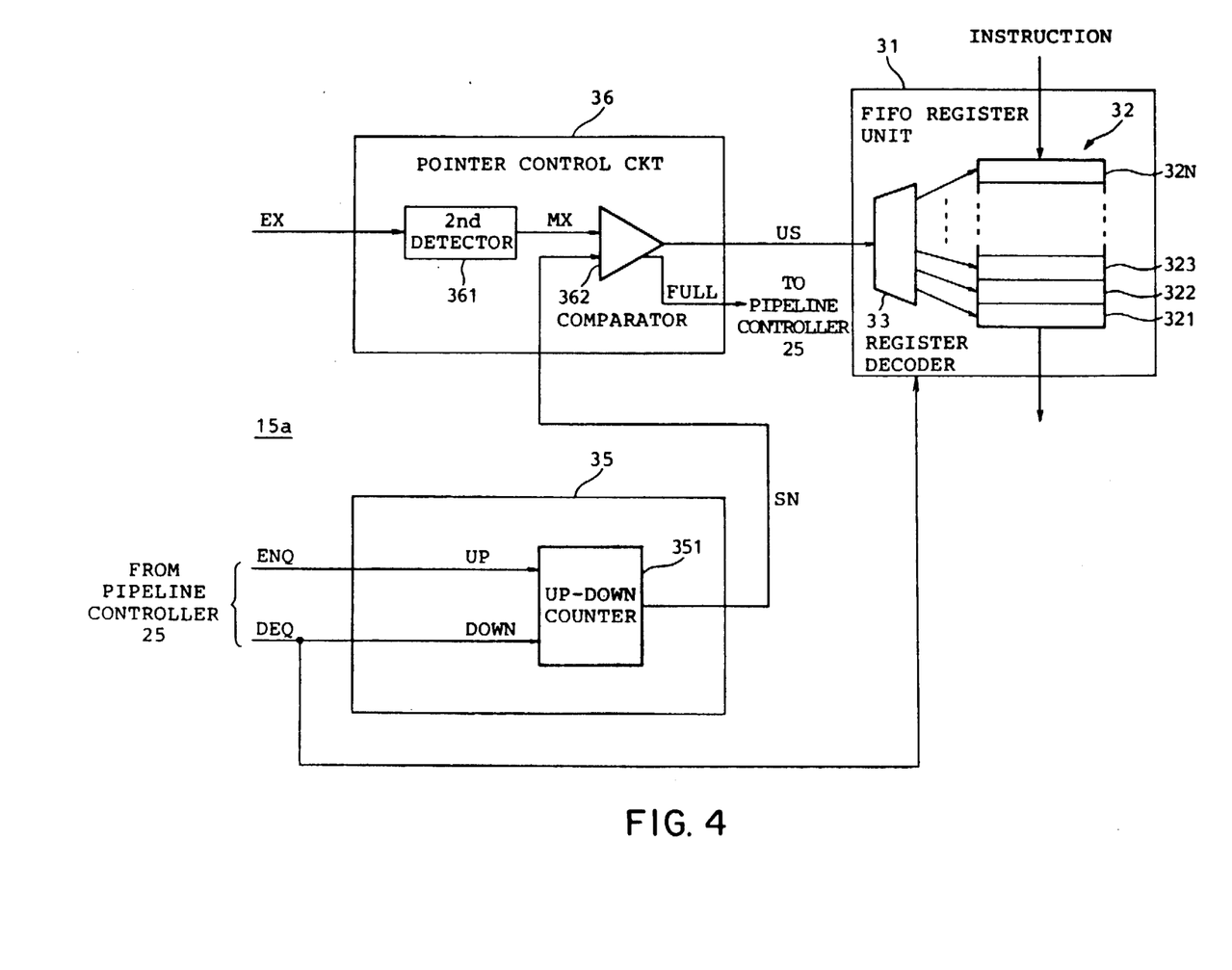
FIG. 4 is a block diagram of a first-in-first-out register device according to a preferred embodiment of this invention.

Referring to FIG. 4, a first-in-first-out register device 15a according to a preferred embodiment of this invention is shown for use in combination with an address calculation circuit 13 and an operation execution circuit 18, like in FIG. 1, but capable of favorably coping with variations of a minimum execution time of a bus cycle for accessing a bus 19. The illustrated first-in-first-out register device comprises a first-in-first-out register unit 31 which is coupled to an external device (not shown). The first-in-first-out register unit 31 is operable to memorize instructions which form a queue between the address calculation circuit 13 and the operation execution circuit 18.

The first-in-first-out register unit 31 comprises a register block 32 having first through n-th register stages 321 to 32n connected in series from the n-th register stage to the first register stage. The register block 32 is controlled by a register decoder 33 so as to vary a stage number of the register block 32 in a manner to be described later. This shows that the stage number of the register block 32 is variable from one to another in the illustrated first-in-first-out register unit 15a.

In FIG. 4, the illustrated first-in-first-out register device 15a further comprises a detector 35 supplied with the write-in timing signal ENQ and the readout timing signal DEQ which are sent from the pipeline controller 25, as mentioned in conjunction with FIG. 1. The detector 35 may be called a first detector and detects the stage number of the register block 32 to produce an actual stage number signal SN which is representative of the stage number. Specifically, the actual stage number signal SN indicates an actual stage number that is being actually used in the register block 32. For this purpose, the first detector 35 comprises an up-down counter 351 which is counted up and counted down in response to the write-in timing signal ENQ and the readout timing signals DEQ, respectively. As a result, a count of the up-down counter 351 indicates the actual stage number and is sent as the stage number signal from the up-down counter 351 to a pointer control circuit 36. No count operation is carried out by the up-down counter 351 when the write-in and the readout timing signals ENQ and DEQ are simultaneously given to the up-down counter.

It is to be noted here that the actual stage number can be determined in relation to a minimum execution time which is necessary for accessing the bus 19 and which is defined by a clock cycle, as described with reference to FIG. 1. For example, when the minimum execution time is equal to two clock cycles, the register block 32 may have three stages. In other words, a maximum stage number of the register block 32 may be equal to three when the minimum execution time has a time duration equal to two clock cycles. Likewise, when the minimum execution time is equal to a single clock cycle, the register block 32 may have two stages, namely, a maximum stage number of two.

The pointer control circuit 36 may be considered as being connected to the pipeline controller 25 without loss of generality. At any rate, the pointer control circuit 36 is supplied with an execution time signal EX which is representative of the minimum execution time and which is given from the pointer control circuit 36 in the illustrated example. The execution time signal EX is supplied to a second detector 361 of the pointer control circuit 36. Supplied with the execution time signal EX, the second detector 361 detects a maximum stage number of the register block 32 from the execution time signal EX to produce a maximum stage number signal MX representative of the detected maximum stage number. The maximum stage number signal MX and the actual stage number signal SN are delivered from the second and the first detectors 361 and 35 to a comparator 362 to be compared with each other.

When the actual stage number signal SN indicates a stage number smaller than the maximum stage number indicated by the maximum stage number signal MX, the comparator 362 produces the actual stage number signal SN as a usable stage number signal US indicative of a usable stage number.

On the other hand, the actual stage number signal SN indicates the maximum stage number indicated by the maximum stage number signal MX, the comparator 362 produces a full signal FULL indicative of the full state of the register block 32. The full signal FULL is sent from the comparator 362 to the pipeline controller 25 (FIG. 1). Supplied with the full signal FULL, the pipeline controller 25 controls the first-in-first-out register device 15a while the register block 32 exceeds the maximum stage number. Specifically, the pipeline controller 25 puts the address calculation circuit 13 (FIG. 1) into an interrupt state of interrupting a fetch operation until the readout timing signal DEQ is received from the pipeline controller 25, as mentioned in conjunction with FIG. 1, when the full signal FULL is supplied from the comparator 362. In this state, no write-in timing signal ENQ is delivered from the pipeline controller 25, as in FIG. 1.

Further referring to FIG. 4, the usable stage number signal US is sent from the comparator 362 to the register decoder 33 of the first-in-first-out register unit 31. Responsive to the usable stage number signal US, the register decoder 33 decodes the stage number of the register block 32 to produce a control signal representative of the stage number. The control signal enables the register stage of the register block 32 that is indicated by the control signal to memorize an instruction in timed relation to the write-in timing signal ENQ.

Supplied with the readout timing signal DEQ, the first-in-first-out register unit 31 is controlled so that an instruction is read out of the first stage 321 into which another instruction is shifted from the second stage. Thus, instructions memorized in the register block 32 are successively shifted downwards of FIG. 4 in response to the readout timing signal DEQ.

In addition, when the count of the up-down counter 351 is equal to zero, the first-in-first-out register unit 31 is put into an empty state. Accordingly, an input instruction is not memorized into the first-in-first-out register unit 31 and is produced through the register block 32 while the write-in timing signal ENQ is not given from pipeline controller 25.

Now, let the minimum execution time be equal to two clock cycles. In this connection, the execution time signal EX indicates two clock cycles. Under the circumstances, the second detector 361 of the pointer control circuit 36 detects three register stages as the maximum stage number of the register block 32. Accordingly, only the first, second, and third stages 321, 322, and 323 are used in the register block 32.

With this structure, the full signal FULL is delivered from the comparator 362 to the pipeline controller 25 when instructions are memorized in all of the first, second, and third register stages 321, 322, and 323 and the count of the up-down counter 351 becomes equal to three. This shows that the remaining or fourth through n-th stages 324 to 32n of the register block 32 are unused. This situation is similar to that illustrated with reference to FIG. 1, on the assumption that the first-in-first-out register device 15 (FIG. 1) has three invariable stages and that the execution time is equal to two clock cycles. Therefore, the address calculation circuit 13 and the operation execution circuit 18 execute the instructions without any extinction of data signals in the pipeline fashions illustrated in conjunction with FIGS. 2A and 2B. As a result, an operation is carried out in accordance with the timing chart illustrated in FIGS. 2A and 2B.

Figure 5A:
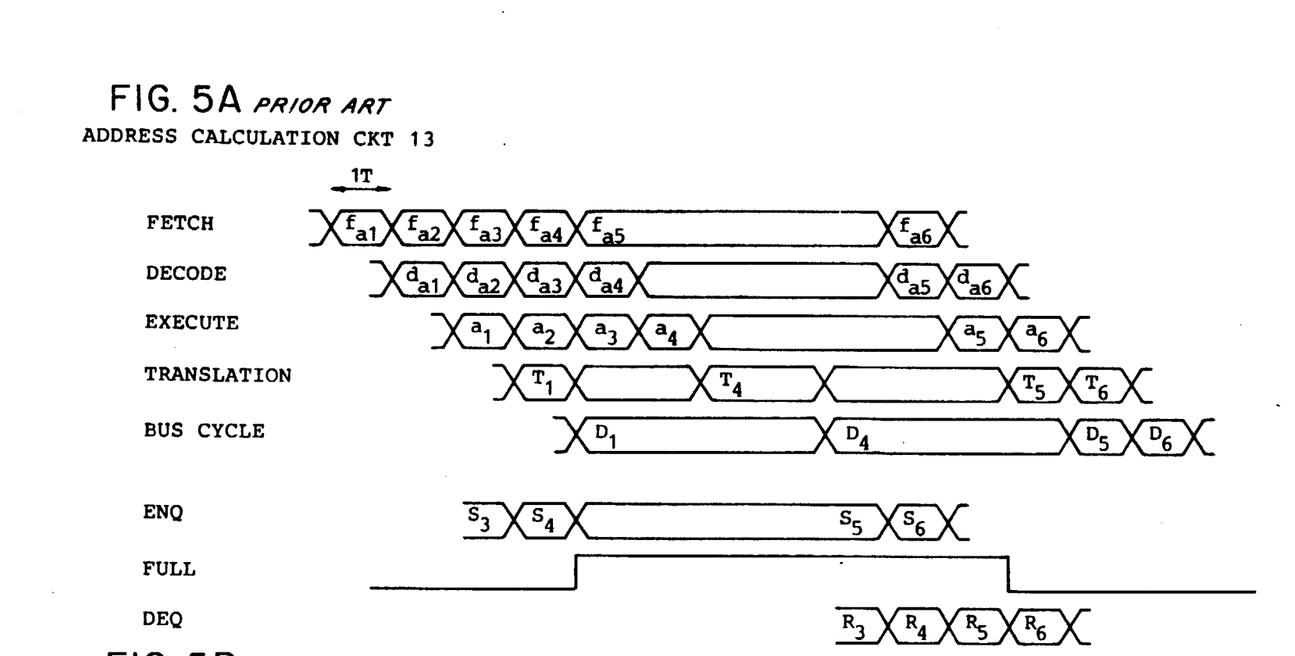
FIGS. 5A and 5B are time charts for use in describing the operation of an information processing device which comprises the first-in-first-out register device illustrated in FIG. 4.
Figure 5B:
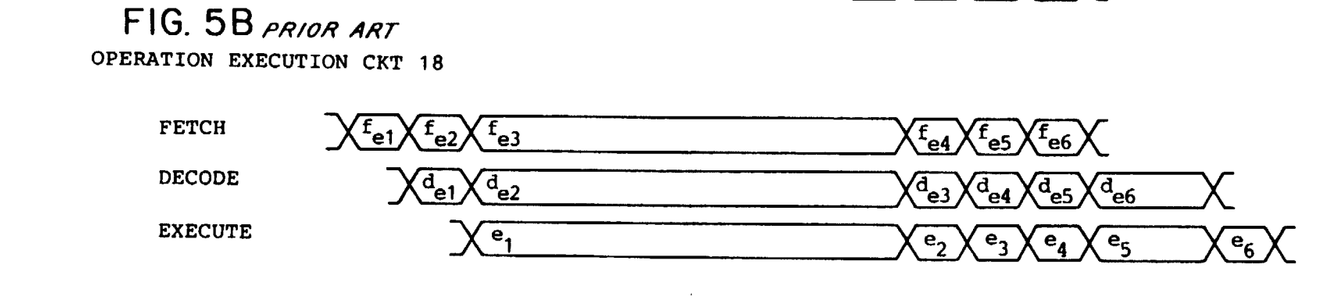

Referring to FIGS. 5A and 5B together with FIGS. 3A and 3B, let the minimum execution time be changed from two clock cycles to a single clock cycle. In this event, the second decoder 361 of the pointer control circuit 36 is supplied with the execution time signal EX indicative of a single clock cycle and produces the maximum stage number signal MX which represents that the maximum stage number is equal to two.

Herein, it is assumed that the instructions are memorized in the first and the second register stages 321 and 322 and the count of the up-down counter 351 becomes equal to two. In this case, the comparator 362 detects coincidence between the maximum stage number signal MX and the actual stage number signal SN to supply the full signal FULL to the pipeline controller 25. Thus, the pipeline controller 25 controls the first-in-first-out register device 15a so that the register block 32 is not used over the second register stage 322. Specifically, production of the write-in and the readout timing signals ENQ and DEQ are controlled by the pipeline controller 25. At any rate, the maximum usable stage number is automatically restricted to two register stages when the minimum execution time for the bus access operation is equal to a single clock cycle.

In FIG. 5A, the address calculation circuit 13 carries out pipeline control specified by the bus cycles $D_1$, $D_4$, $D_5$, and $D_6$, like in FIG. 3. In the illustrated bus cycles $D_1$, $D_4$, $D_5$, and $D_6$, each of the bus cycles $D_4$, $D_5$, and $D_6$ has a minimum execution time equal to a single clock cycle. In addition, data signals for the bus cycles $D_1$ and $D_4$ lasts for four clock cycles in the read data register 23 (FIG. 1), as shown in FIG. 5A. Thereafter, data signals for the fifth and the sixth instructions 5 and 6 are successively memorized in the read data register 23.

When the third and the fourth instructions 3 and 4 are written into the first-in-first-out register unit 31, as shown at $S_3$ and $S_4$, in response to the write-in timing signals ENQ, the pointer control circuit 36 delivers the full signal FULL to the pipeline controller 25. Therefore, memorization of the fifth and the sixth instructions 5 and 6 into the first-in-first-out register unit 31 is delayed until reception of the readout timing signals DEQ, as shown at $S_5$ and $S_6$. The third and the fourth instructions 3 and 4 are read out of the first-in-first-out register unit 31 in response to the readout timing signals DEQ, as shown at $R_3$ and $R_4$. Thereafter, the fifth and the sixth instructions 5 and 6 are written into the first-in-first-out register unit 31 in response to the write-in timing signals ENQ, as shown at $S_5$ and $S_6$, and read out of the first-in-first-out register unit 31 two clock cycles after, as illustrated at $R_5$ and $R_6$.

In the operation execution circuit 18, the first instruction 1 is successively subjected to the fetch, decode, and execute stages, as shown at $f_{e1}$, $d_{e1}$, and $e_1$. The third instruction 3 is processed until the readout timing signal DEQ is given from the pipeline controller 25, as illustrated at $R_3$. In this connection, the fourth, fifth, and sixth instructions 4, 5, and 6 are also delayed in the first-in-first-out register unit 31 and are thereafter read out of the first-in-first-out register unit 31 to be executed by the operation execution circuit 18, as illustrated at $e_4$, $e_5$, and $e_6$, respectively.

As readily understood from FIG. 5A, the data signals for the fourth through the sixth instructions 4 to 6 are memorized in the read data register 23, as shown at $D_4$, $D_5$, and $D_6$, when the fourth through sixth instructions 4 to 6 are executed, as shown at $e_4$, $e_5$, and $e_6$, respectively. As a result, the bus cycle stages of the address calculation circuit 13 and the execute stages of the operation execution circuit 18 can be progressive in the order of $D_1$, $e_1$, $D_4$, $e_4$, $D_5$, $e_5$, $D_6$, and $e_6$. This shows that a data signal related to a previous instruction is not erased by a data signal related to a following read instruction.

With this structure, it is possible to adjust pipeline control operations of the address calculation circuit 13 and the operation execution circuit 18 by changing a stage number of a first-in-first-out register device even when deviations of timings occur between both of the pipeline control operations in dependency upon a minimum execution time for a bus access operation. For this purpose, a maximum usable stage number of the first-in-first-out register device is automatically controlled in accordance with the minimum execution time. Accordingly, a normal operation is assured in an information processing device wherein such a minimum execution time is variable.

What is claimed is:

1. A first-in-first-out register device for use in an information processing unit which comprises an address calculation circuit successively supplied with instructions and connected to a bus for successively calculating an address of each instruction to produce an address signal specifying said address, and execution circuit successively supplied with the instructions through said first-in-first-out register device for executing each instruction, and a pipeline controller coupled to said address calculation circuit, said execution circuit and said first-in-first-out register device for controlling said address calculation circuit and said execution circuit in pipeline fashions different from each other, said address calculation circuit accessing said bus during an execution time in response to a specific one of the instructions, said execution time being varied and being indicated by an execution time signal representative of said execution time, said first-in-first-out register device being positioned intermediate between said address calculation circuit and said execution circuit to memorize a queue of the instruction, said first-in-first-out register device comprising:

- a first-in-first-out register unit which is successively supplied with instructions and which has a predetermined number of register stages, for successively memorizing said instructions;
- detector means connected to said pipeline controller for detecting an actual stage number of said first-in-first-out register unit used to produce, under control of said pipeline controller, an actual stage number signal representative of said actual stage number;
- signal producing means responsive to said execution time signal for producing a maximum usable stage signal indicative of a maximum usable stage number of said first-in-first-out register unit, said maximum usable stage number being determined by said execution time on accessing said bus in response to said specific one of the instructions and being varied in dependency upon said execution time; and
- comparing means connected to said signal producing means, said detector means and said first-in-first-out register unit and supplied with said actual stage number signal from said detector means and said maximum usable stage signal from said signal producing means for comparing said actual stage number signal with said maximum usable stage signal to control said first-in-first-out register unit so that said first-in-first-out register unit does not exceed said maximum usable state.

2. A first-in-first-out register device as claimed in claim 1, wherein said comparing means produces said actual stage number signal as a usable stage number signal when said actual stage number is smaller than said maximum usable stage number;

said first-in-first-out register device further comprising:

means for supplying said usable stage number signal to said first-in-first-out register unit.

3. A first-in-first-out register device as claimed in claim 2, wherein said first-in-first-out register unit comprises:

- a register block having said plurality of register stages, which are numbered from a first register stage to an n-th register stage and which can shift the instructions towards said first register stage;
- indicating means supplied with said usable stage number signal for indicating said actual stage number; and
- means for memorizing the instruction in the register stage pointed by said actual stage number.

4. A first-in-first-out register device as claimed in claim 1, wherein said detector means is supplied from said pipeline controller with write-in and readout timing signals for write-in and readout operations of said first-in-first-out register unit, including:

- up-down counter means counted up by said write-in timing signals and counted down by said readout timing signals, for producing said actual stage number signal.

* * * * *